US010802242B2

(12) United States Patent
Miller et al.

(10) Patent No.: US 10,802,242 B2
(45) Date of Patent: Oct. 13, 2020

(54) CAMERA LENS SUSPENSION WITH ENHANCED AUTO FOCUS ELECTRICAL INTERCONNECTS

(71) Applicant: Hutchinson Technology Incorporated, Hutchinson, MN (US)

(72) Inventors: Mark A. Miller, Hutchinson, MN (US); Yasushi Sakamoto, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 15/682,456

(22) Filed: Aug. 21, 2017

(65) Prior Publication Data

US 2018/0052299 A1  Feb. 22, 2018

Related U.S. Application Data

(60) Provisional application No. 62/378,001, filed on Aug. 22, 2016.

(51) Int. Cl.
*G02B 7/09* (2006.01)
*G02B 7/08* (2006.01)
*G02B 7/28* (2006.01)

(52) U.S. Cl.
CPC ............... *G02B 7/09* (2013.01); *G02B 7/08* (2013.01); *G02B 7/282* (2013.01)

(58) Field of Classification Search
CPC . G02B 7/09; G02B 7/08; G02B 7/282; G02B 7/102
USPC .................................. 359/694–699
See application file for complete search history.

(56) References Cited

U.S. PATENT DOCUMENTS

| 8,736,988 B2 * | 5/2014 | Cheng | G02B 6/4457 |
| | | | 359/694 |
| 9,366,879 B1 | 6/2016 | Miller | |
| 2009/0244325 A1 * | 10/2009 | Honjo | G02B 7/102 |
| | | | 348/231.99 |
| 2014/0043496 A1 | 2/2014 | Azuma | |
| 2015/0177477 A1 | 6/2015 | Hubert | |
| 2015/0304561 A1 * | 10/2015 | Howarth | G02B 27/646 |
| | | | 348/374 |

(Continued)

FOREIGN PATENT DOCUMENTS

GB       1221306.2    * 11/2012 ............. G02B 7/026

OTHER PUBLICATIONS

International Search Report and Written Opinion in International Application No. PCT/US2017/047931, dated Oct. 27, 2017.

(Continued)

*Primary Examiner* — Collin X Beatty
(74) *Attorney, Agent, or Firm* — DLA Piper LLP (US)

(57) ABSTRACT

A camera lens assembly is described. The camera lens assembly includes a support member. The camera lens assembly also includes a moving member having a major planar surface and AF terminal pads located at or near the major planar surface, wherein the moving member is mounted to the support member. And, the camera lens assembly includes an auto focus assembly having AF terminal pads, wherein the auto focus assembly is mounted to the moving member and the AF terminal pads of the auto focus assembly are electrically connected to the AF terminal pads of the moving member.

13 Claims, 8 Drawing Sheets

(56) References Cited

U.S. PATENT DOCUMENTS

2015/0365568 A1* 12/2015 Topliss .................... G02B 7/08
                                                      348/360
2016/0154250 A1*  6/2016 Miller ..................... G02B 7/09
                                                      359/557
2016/0154251 A1*  6/2016 Ladwig ................... G02B 7/09
                                                      359/557

OTHER PUBLICATIONS

International Preliminary Report on Patentability in International Application No. PCT/US2017/047931, dated Mar. 7, 2019.
Extended Search Report for European Patent Application No. 17844254.7 dated Mar. 3, 2020.

* cited by examiner

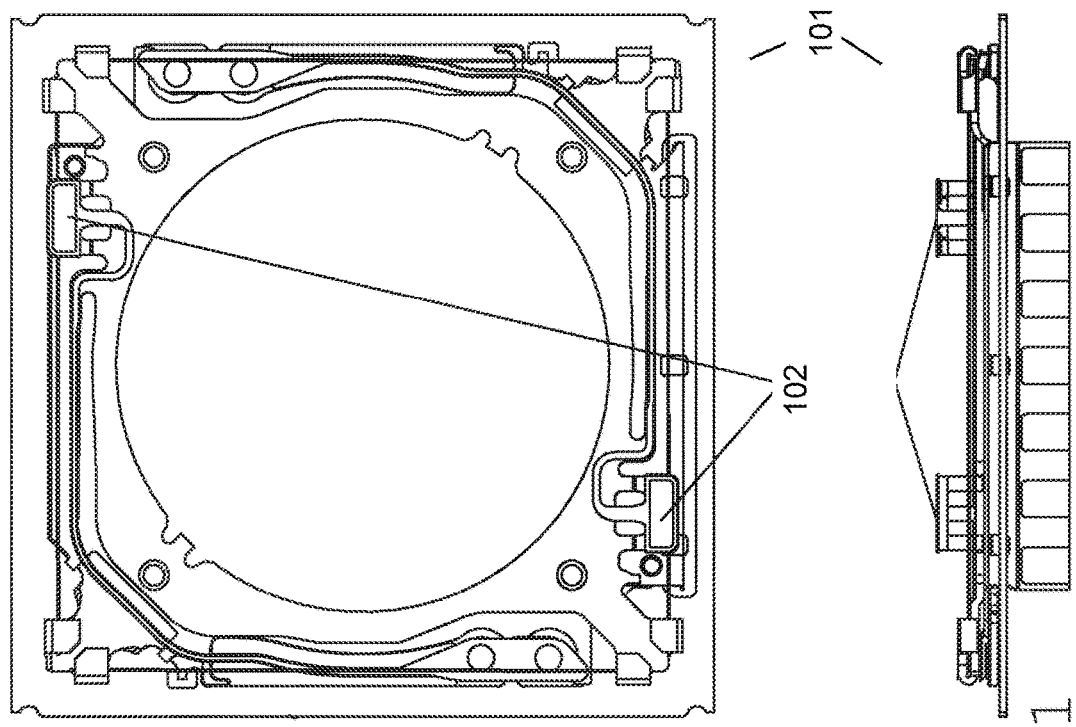
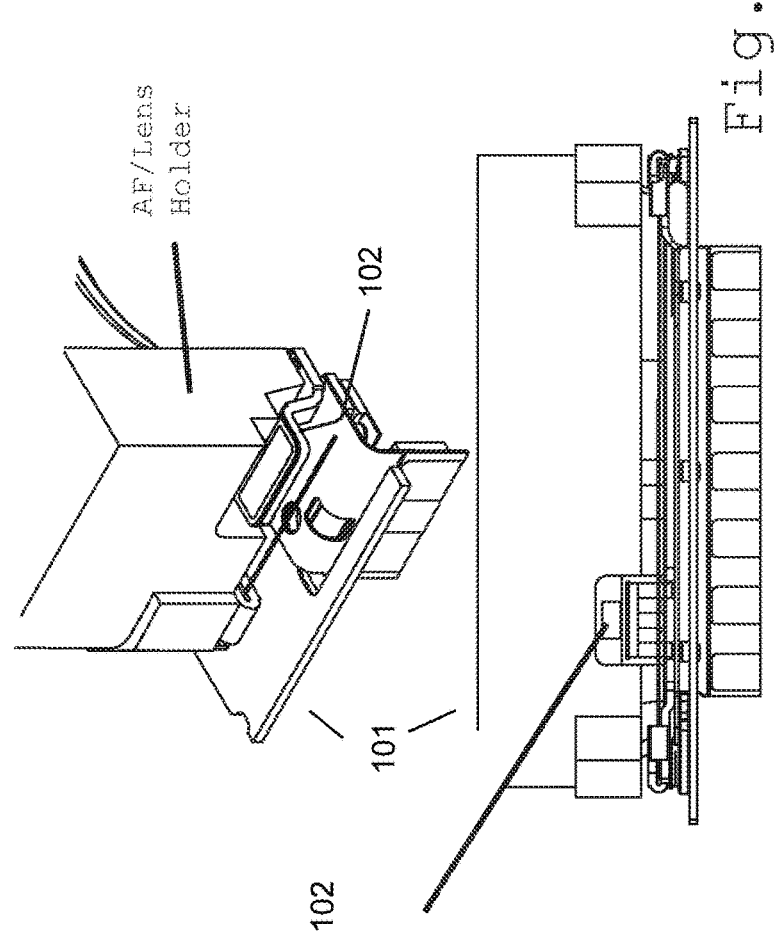
Fig. 1
Prior Art

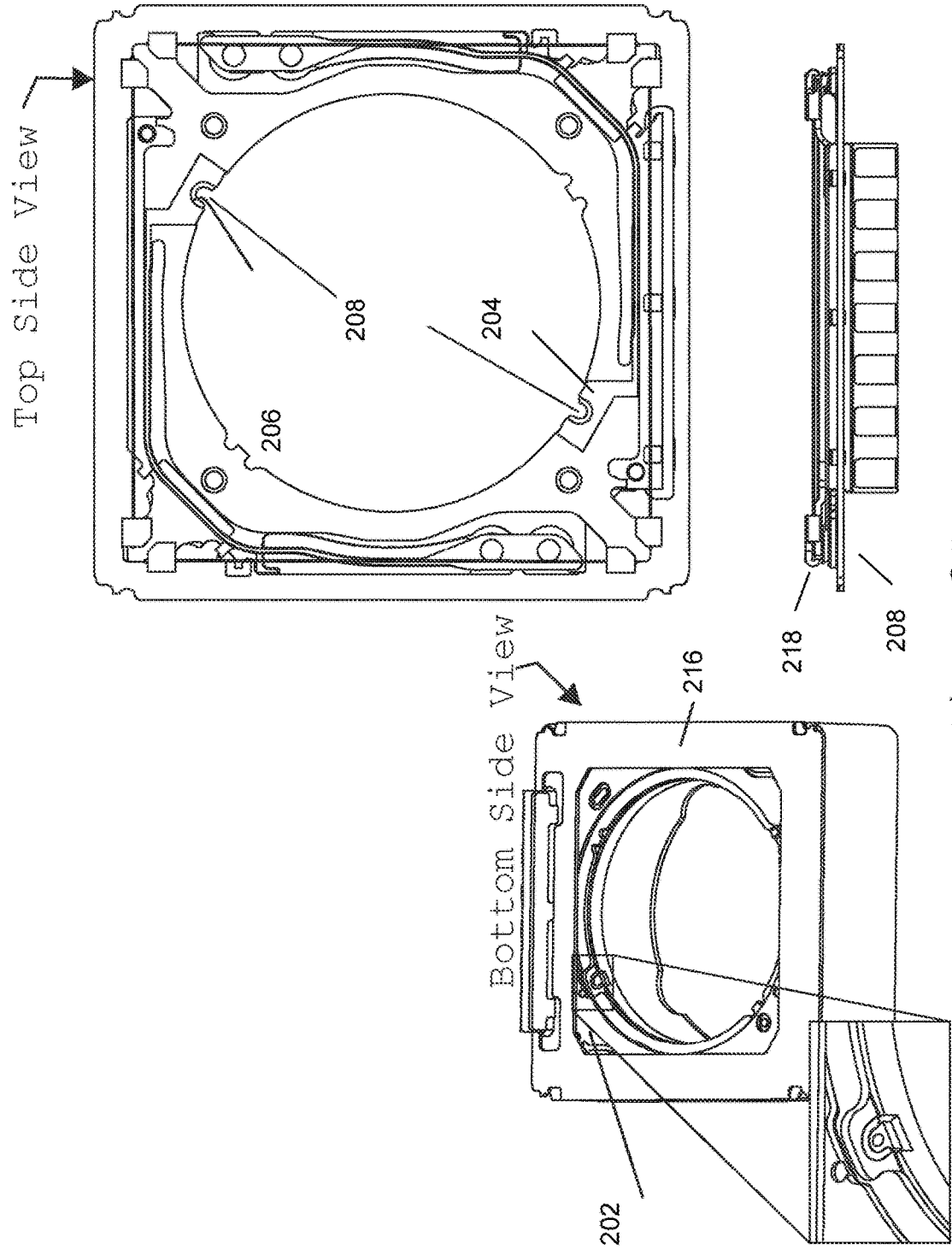

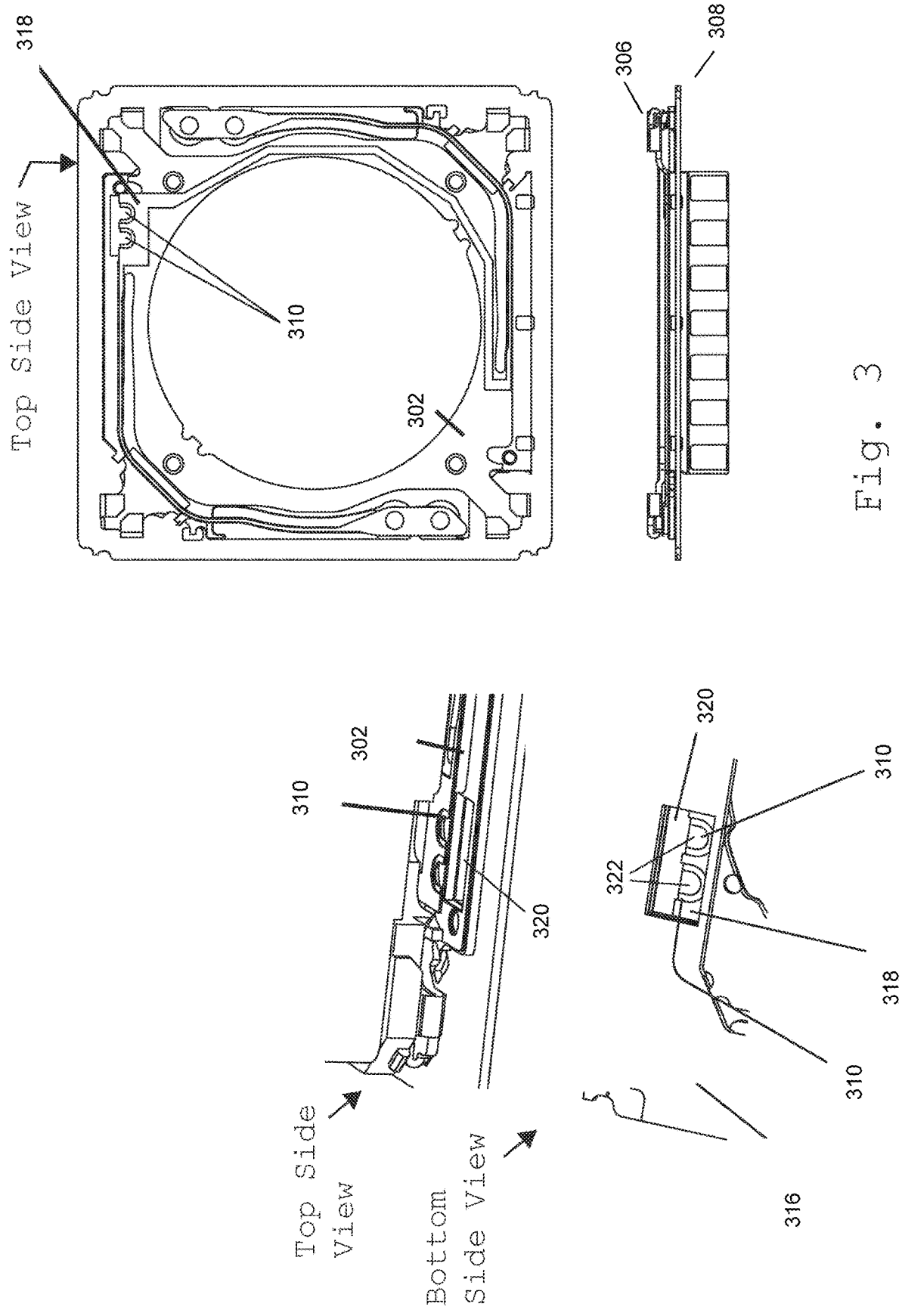

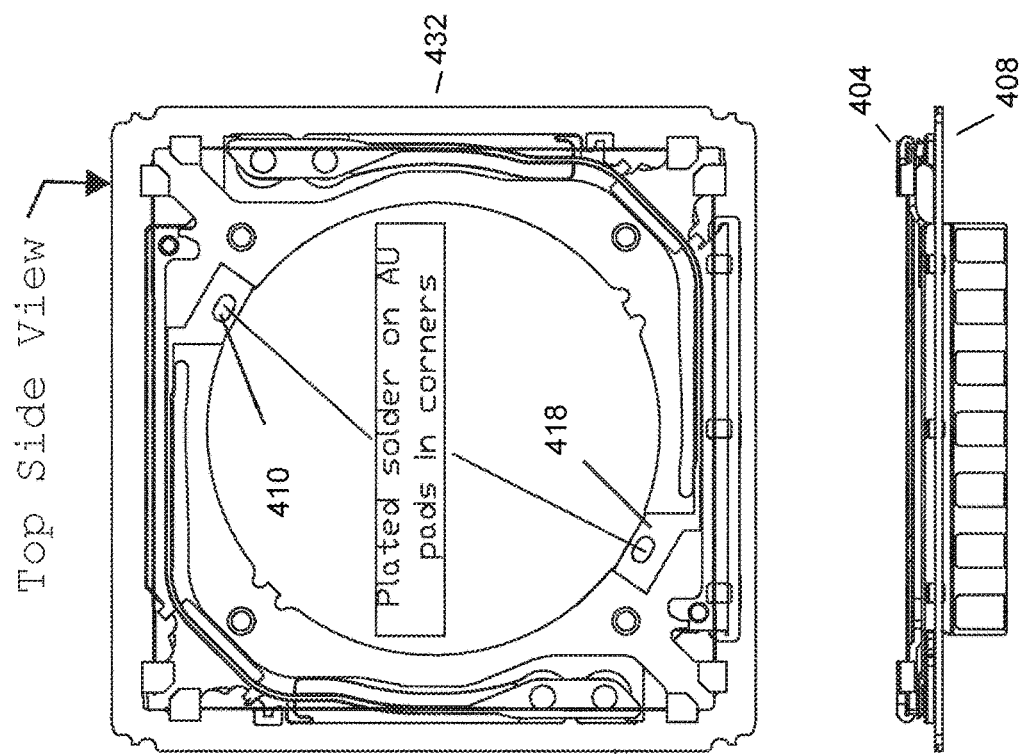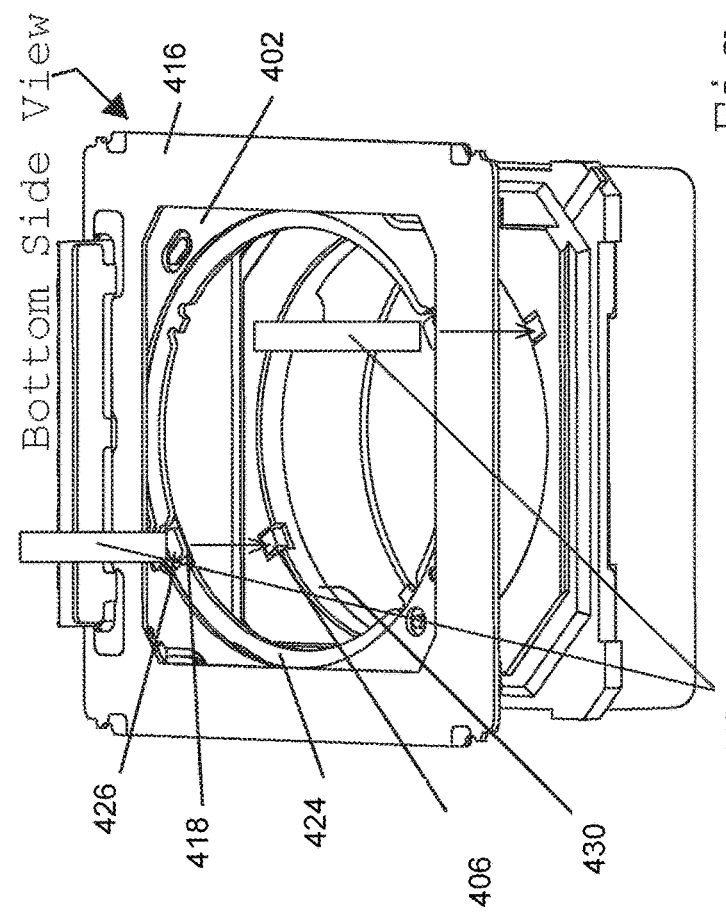
Fig. 4

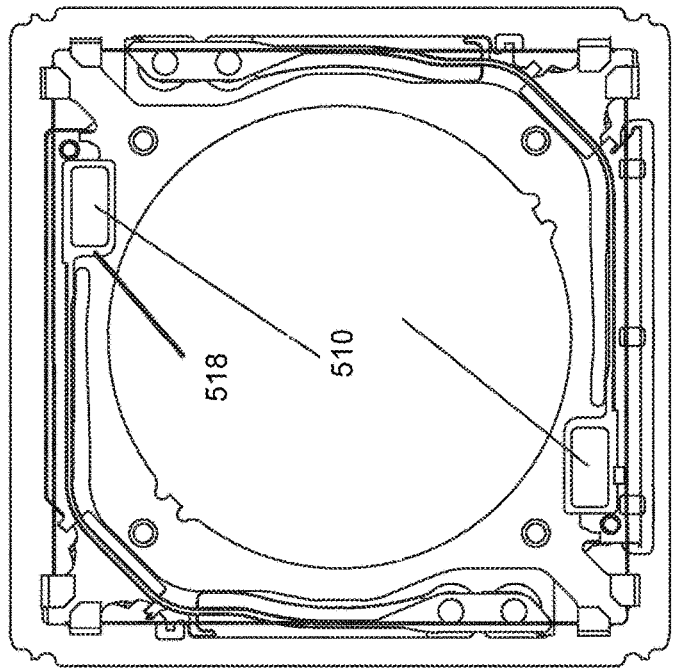
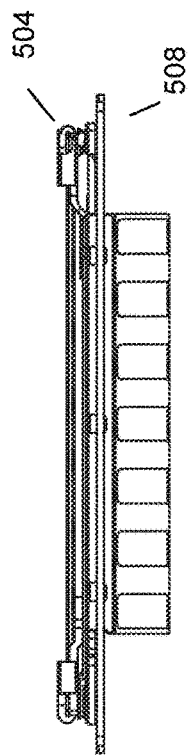
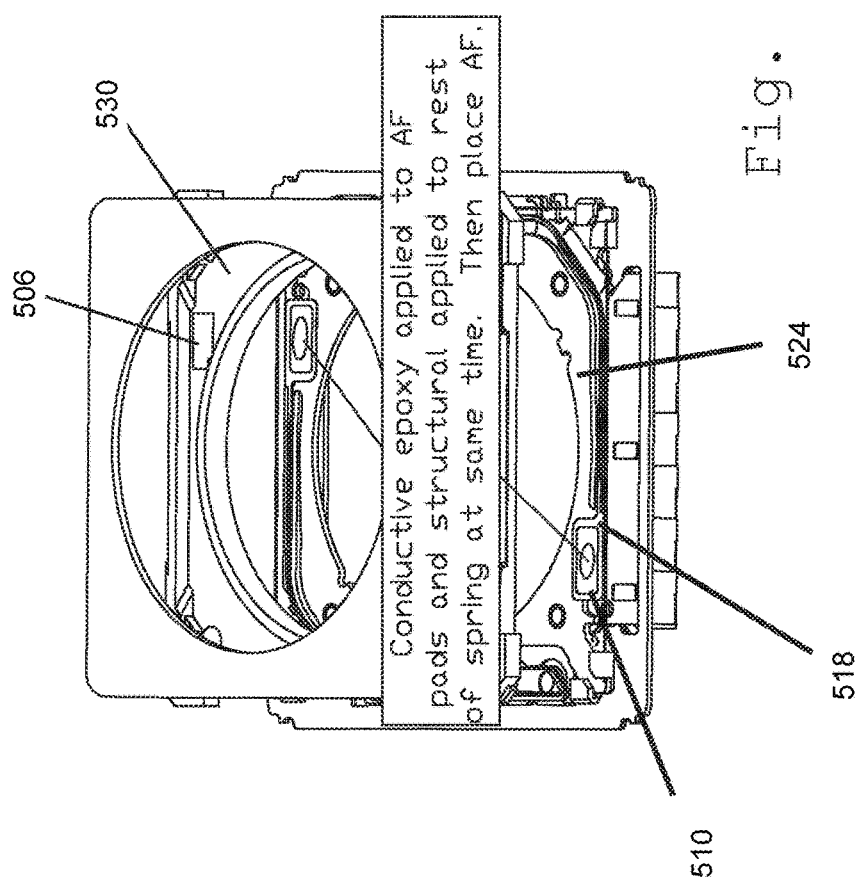
Fig. 5

CAMERA LENS SUSPENSION WITH ENHANCED AUTO FOCUS ELECTRICAL INTERCONNECTS

CROSS-REFERENCE TO RELATED APPLICATIONS

This application claims priority from U.S. Provisional Patent Application No. 62/378,001, filed on Aug. 22, 2016, which is hereby incorporated by reference in its entirety.

FIELD

The invention relates generally to camera lens suspensions such as those incorporated into mobile devices such as phones and tablets. In particular, the invention relates to such suspensions that include an auto focus system.

BACKGROUND

Camera lens optical image stabilization (OIS) assemblies are generally known and disclosed, for example, in the Miller U.S. Pat. No. 9,366,879 and the Ladwig U.S. Patent Application Publication 2016/0154251, both of which are incorporated herein by reference in their entireties and for all purposes. Embodiments include a moving member mounted to a support member. A base can be mounted to the side of the support member opposite the moving member. OIS assemblies of these types can have a lens holder with an auto focus (AF) assembly or system mounted thereto (e.g., to the moving member). Electrical connections to the AF system are made by electrically connecting (e.g., solder or conductive adhesive) terminal pads on the AF assembly to terminal pads on the OIS assembly. In embodiments such as those shown in the Miller patent, Ladwig publication, and FIG. 1 herein, the terminal pads on the AF assembly are at locations above the lowermost portion or base of the assembly, and the terminal pads 102 on the OIS assembly 101 are on pads or "gooseneck" forms that are above the major planar surface of the moving member. The location of the AF electrical connection between the OIS and AF assemblies is thereby over the shape memory alloy (SMA) wires of the OIS assembly, while still being accessible from the outside to enable the lens holder builder to make the electrical connections.

SUMMARY

A camera lens assembly is described. The camera lens assembly includes a support member. The camera lens assembly also includes a moving member having a major planar surface and AF terminal pads located at or near the major planar surface, wherein the moving member is mounted to the support member. And, the camera lens assembly includes an auto focus assembly having AF terminal pads, wherein the auto focus assembly is mounted to the moving member and the AF terminal pads of the auto focus assembly are electrically connected to the AF terminal pads of the moving member.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIG. 1 illustrates several views of an optical image stabilization assembly including a terminal pad on a gooseneck form;

FIGS. 2A-B illustrate an OIS assembly including terminal pads according to an embodiment;

FIG. 3 illustrates an OIS moving member terminals according to an embodiment;

FIG. 4 illustrates an OIS assembly including terminal pads according to another embodiment;

FIG. 5 illustrates an embodiment having OIS moving member AF terminals according to an embodiment;

DETAILED DESCRIPTION

Embodiments of the invention include OIS and AF assemblies having OIS-AF electrical interconnect structures that are located at or near the major planar surface of the OIS moving member. The interconnect structures include AF terminal pads on the OIS and AF assemblies that are electrically connected by, e.g., solder or conductive adhesive.

Figure 2B:
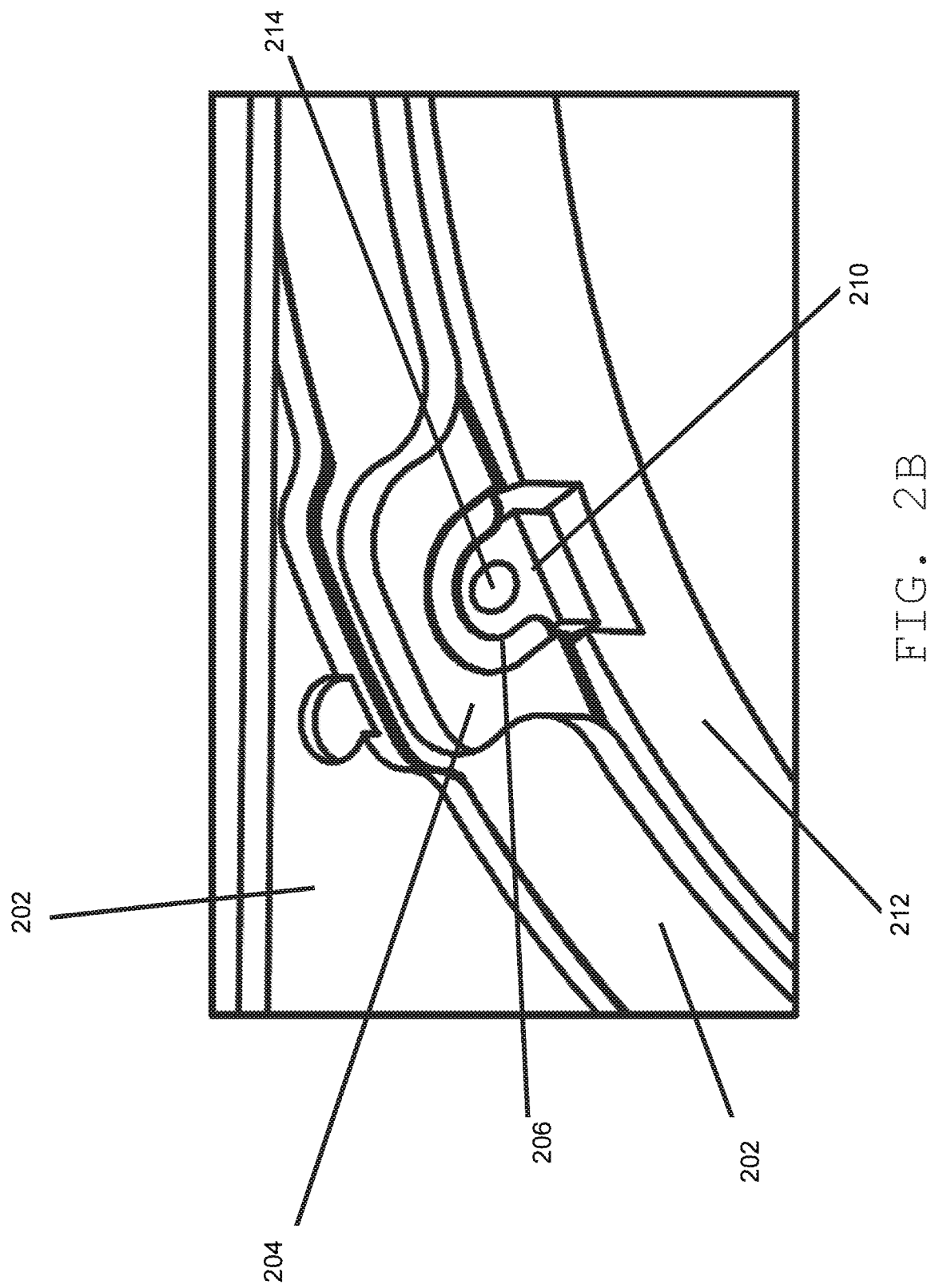

FIGS. 2A and 2B illustrate an embodiment where the terminal pads on the AF assembly and the OIS assembly are located at or adjacent the plane of the plate of the OIS moving member, near the inner diameter (ID) of the plate and at a location on the plate that is not covered by the OIS assembly base or the base (e.g., stainless steel) layer of the support member. As shown, the stainless steel layer 202 that is a major planar surface of the moving member 218 and polyimide/insulating layers 204 of the moving member 218 have openings that provide bottom-side or back-side access to the terminal pad 206 on the moving member 218. The terminal pad 206 on the moving member 218, which is formed from the conductor layer, has an opening 208 defined by an edge that also provides access to the terminal pad 210 on the AF assembly 212. In the illustrated embodiment, the terminal pad 206 on the moving member 218 is "horseshoe" shaped to locate at least a portion of the moving member terminal 206 adjacent to the AF assembly terminal 210, and in a co-planar relationship. Thus, the terminal pad 206 of the moving member 218 are located at or near the major planar surface of the moving member 218. For an embodiment, the terminal pad 206 has a portion that extends beyond the insulating layer of the moving member 218 and which can have an edge defining an aperture through a conductive material layer.

In other embodiments (not shown) the terminal pad of the OIS assembly can have a through hole that is surrounded by the conductive material of the terminal pad, and that is located over the terminal pad of the AF assembly. The terminal pads 206 on the moving member 218 can be coupled to traces as shown in the Miller patent and Ladwig publication. The terminal pads of the OIS and AF assemblies are electrically connected by solder or conductive adhesive 214 that can be applied from the bottom side of the OIS assembly (i.e., from the side opposite the moving member of the AF assembly, and through the OIS base 216 and the base layer of the support member). The mass of solder or conductive adhesive 214 will overlap onto both the moving member terminal pads 206 and AF terminal pads 210.

FIG. 3 illustrates an embodiment having OIS moving member terminals that are structurally similar to those shown in the embodiment of FIGS. 2A and 2B. In the FIG. 3 embodiment, the terminal pads 306 on the OIS moving member 306 are located adjacent to one another, and at a location that is outwardly spaced from the inner diameters of the OIS base 316, the OIS support member 308 and the OIS moving member 306. The terminal pads of the AF assembly will also be located adjacent one other. The OIS base 316, the stainless steel layers 302 of the OIS support member and of the OIS moving member, and the polyimide insulating layer 318 of the OIS moving member, have openings 322 to provide bottom-side access to the terminal pads 310 on the OIS moving member 306 and AF assembly. Further, an opening 320 in the OIS base 316 and stainless steel layer 302 of OIS support member 308 provide access to the terminal pads 310 and openings 322. The terminal pads on the OIS moving member and AF assembly are located with respect to one another, and can be interconnected, in a manner similar to that described above in connection with the FIGS. 2A and 2B embodiments.

FIG. 4 illustrates another embodiment, where the terminal pads on the AF assembly and the OIS assembly are located at or adjacent the plane of the OIS plate of the OIS moving member, near the inner diameter (ID) of the plate and at a location on the plate that is not covered by the OIS assembly base 416 or the base (e.g., stainless steel) layer of the support member 402. As shown, the OIS moving member AF terminal pads 410 are located over a portion of the moving member stainless steel layer 424 (with the poly layer 418 located between the AF terminal pads 410 and the stainless steel layer 424). In the illustrated embodiment, the OIS moving member AF terminal pads 410 are located over stainless steel islands 426. In other embodiments (not shown), the OIS moving member AF terminal pads are located over non-isolated portions of moving member stainless steel layer. Plated solder can be located on the moving member AF terminal pads 410. The AF terminal pads 406 of the AF assembly 430 are located on the assembly at locations that contact the moving member AF terminal pads 410 when the AF assembly 430 is mounted to the OIS assembly 432. The bottom side access to the stainless steel portions 424 of the moving member 404 opposite the moving member AF terminal pads 410 enables a heated tip 440 to contact the stainless steel layer, and thereby heat and reflow the solder on the moving member terminal pads 410 to electrically connect the moving member 404 and AF terminal pads 406. In other embodiments, the moving member terminals 410 and AF terminal pads 406 can be structurally and electrically connected by conductive adhesive. The terminal pads 410 on the moving member 404 can be coupled to traces using techniques know in the art, for example using techniques as shown in the Miller patent and Ladwig publication. According to an embodiment, to aid in heat flow of a heated tip 440 to reflow solder, the AF terminal pad 406 is electrically connected to the spring metal island 426 directly underneath it, which the heated tip 440 contacts. This can provide a maximum speed of heat transfer to the solder.

FIG. 5 illustrates an embodiment having OIS moving member AF terminals that are structurally similar to those shown in the embodiment of FIG. 4. In the FIG. 5 embodiment, the terminal pads 510 of the OIS moving member 504 are at a location that is outwardly spaced from the inner diameters of the OIS base, the OIS support member 508 and the plate of the OIS moving member 504. The terminal pads 510 on the OIS moving member 504 and terminal pads 506 on the AF assembly 530 are located with respect to one another, and can be interconnected, in a manner similar to that described above in connection with the FIG. 4 embodiment.

Figure 6:
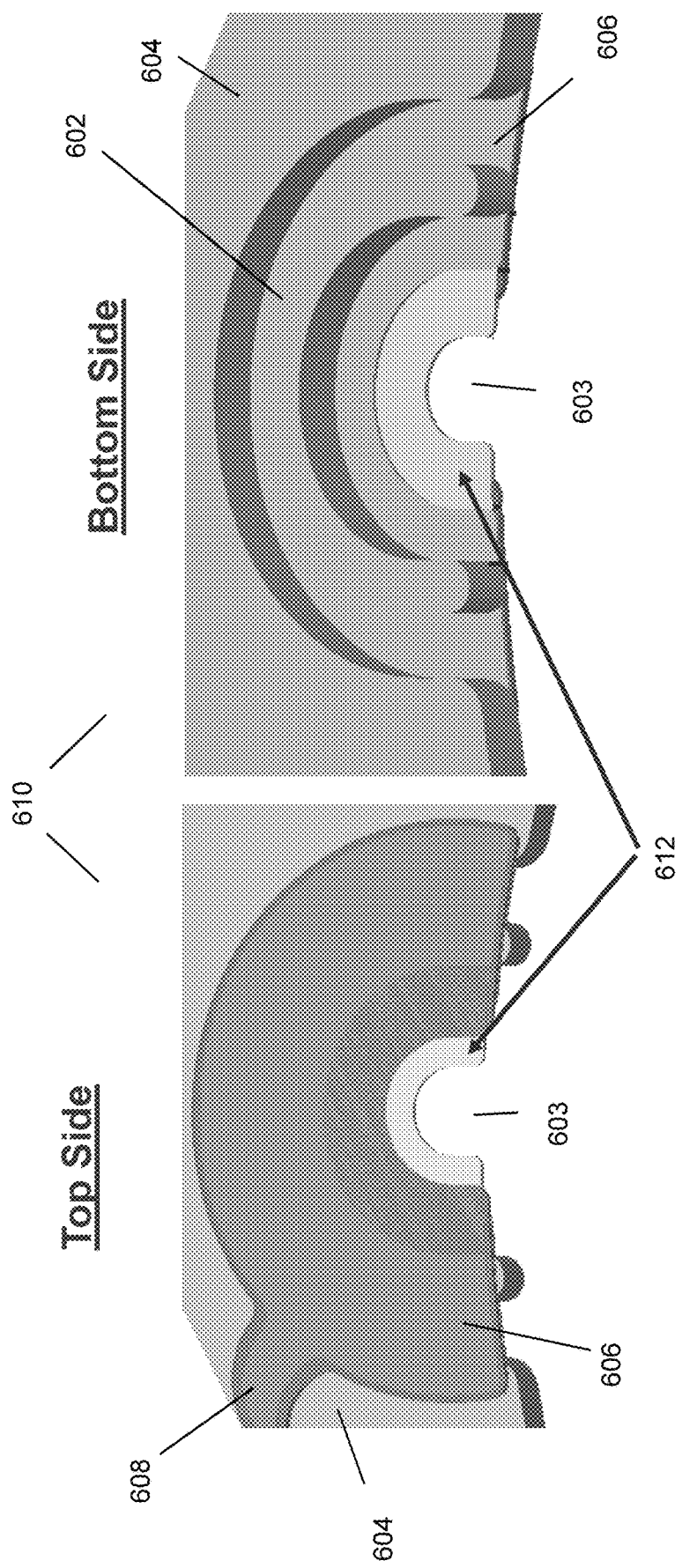
FIG. 6 illustrates a terminal pad according to an embodiment.

FIG. 6 illustrates a terminal pad according to an embodiment. The terminal pad 610 is formed in a "horseshoe" shape and may be located on the inner diameter of an OIS moving member such as described herein. The terminal pad 610 includes an inner stainless steel horseshoe 602 isolated from the stainless steel layer 604. For an embodiment, the stainless steel layer is etched to form a void having a horseshoe shape in the stainless steel layer and forming an inner stainless steel horseshoe 602 using techniques including those known in the art.

The terminal pad 610 includes a conductive pad 606 formed on the stainless steel layer 604 and extending beyond the stainless steel layer 604 into the horseshoe void formed in the stainless steel layer 604 and the inner stainless steel horseshoe 602. For an embodiment, the conductive pad 606 defines a void 603. The conductive pad 606 is coupled with a conductive trace 608. The conductive pad 606 and conductive trace 608 may be part of a conductive layer of an OIS moving member. For some embodiments, the conductive trace 606 is copper. One skilled in the art would understand that other conductive materials may be used.

The terminal pad 610, according to some embodiments, includes a gold plated portion 612 of the conductive pad 606. The conductive pad 606 is configured to contact with another terminal pad, such as a terminal pad of an AF assembly as described herein. According to an embodiment, the inner stainless steel horseshoe 602 is configured to act as a dam to stop any inadvertent solder or conductive epoxy from causing a short circuit between an AF terminal pad and a stainless steel layer 604, for example a plate metal of a moving member. Thus, the inner stainless steel horseshoe 602 makes manufacturing an electrical connection easier and more reliable.

Figure 7:
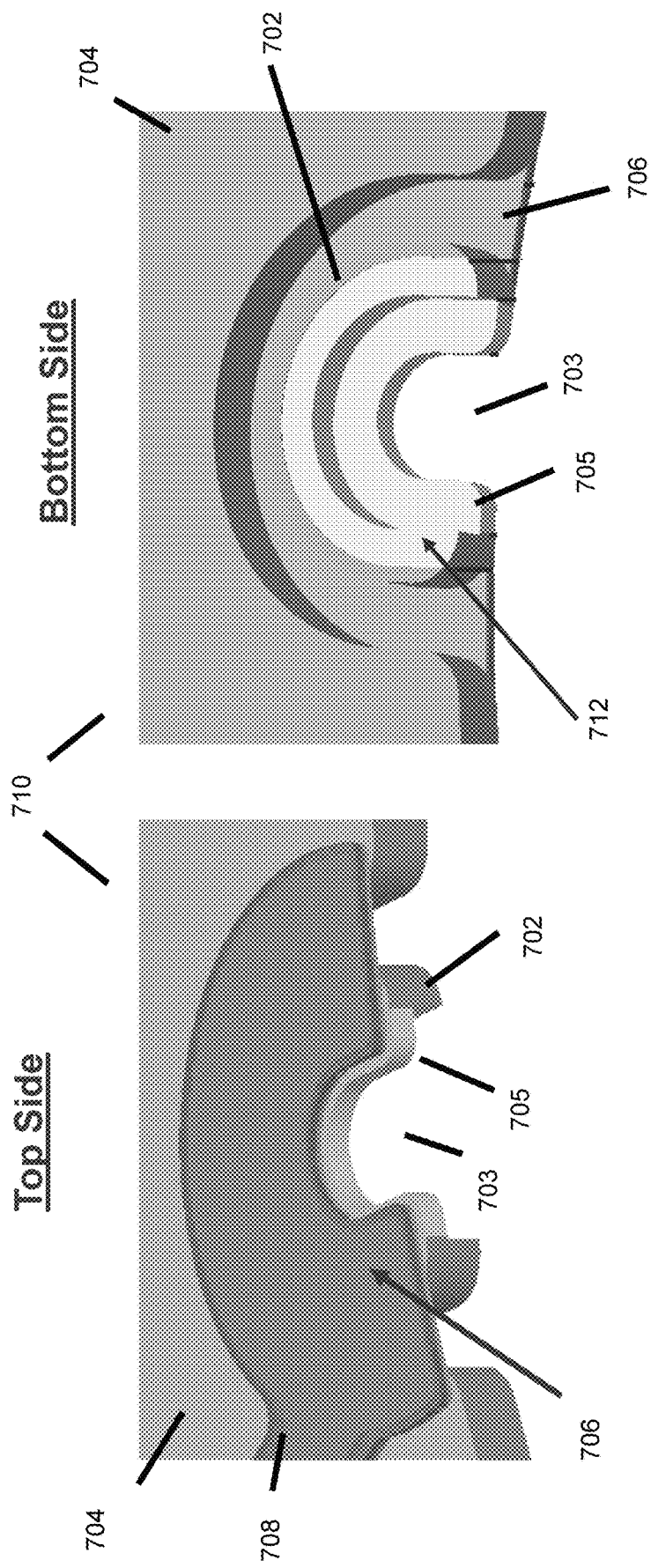
FIG. 7 illustrates a terminal pad according to another embodiment.

FIG. 7 illustrates a terminal pad according to another embodiment. The terminal pad 710 is formed in a "horseshoe" shape and may be located on the inner diameter of an OIS moving member such as described herein. The terminal pad 710 includes an inner stainless steel horseshoe 702 isolated from the stainless steel layer 704. For an embodiment, the stainless steel layer 704 is etched to form a void having a horseshoe shape in the stainless steel layer 704 and forming an inner stainless steel horseshoe 702 using techniques including those known in the art. The inner stainless steel horseshoe 702 includes a pad portion 705 that is configured to have a lower height than the rest of the inner stainless steel horseshoe 702. The pad portion 705 is configured to receive another terminal pad to make an electrical connection between the two terminal pads, for example, a terminal pad of an AF assembly.

The terminal pad 710 includes a conductive pad 706 formed on the stainless steel layer 704 and extending beyond the stainless steel layer 704 into the horseshoe void formed in the stainless steel layer 704. The conductive pad 706 is coupled with a conductive trace 708. According to an embodiment, the conductive pad 706 is electrically coupled with the inner stainless steel horseshoe 702 but does not extend beyond the inner horseshoe void 703 formed in the inner stainless steel horseshoe 702. The conductive pad 706 and conductive trace 708 may be part of a conductive layer of an OIS moving member. For some embodiments, the conductive trace 706 is copper. One skilled in the art would understand that other conductive materials may be used.

The terminal pad 710, according to some embodiments, includes a gold plated portion 712 of the inner stainless steel horseshoe 702 including the pad portion 705 of the inner stainless steel horseshoe 702. The conductive pad 706 is configured to contact with another terminal pad, such as a terminal pad of an AF assembly as described herein. According to an embodiment, the pad portion 705 is configured to act as a dam to stop any inadvertent solder or conductive epoxy from causing a short circuit between an AF terminal pad and a stainless steel layer 604, for example a plate metal of a moving member. Thus, the inner stainless steel horseshoe 602 makes manufacturing an electrical connection easier and more reliable.

Embodiments of the invention offer important advantages. For example, they can minimize the impact of OIS AF connection on the design of the AF assembly. They can alleviate issues associated with the formed up AF gooseneck pads such as those of the prior art that require clearances in the AF assembly bottom that can lead to a thicker AF assembly and limit the Z-stroke of the AF assembly. They make room for the AF bottom spring to be placed lower in the AF base, which can enable greater AF stroke. They can also alleviate issues associated with structural weakening and relatively low shock robustness presented by the gooseneck form.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A camera lens assembly comprising:
   an optical image stabilization assembly including:
   a support member,
   a moving member having a major planar surface, an inner portion, and a first set of AF terminal pads located on the inner portion at the major planar surface, the moving member is mounted to the support member, and
   an auto focus assembly having a second set of AF terminal pads, the auto focus assembly is mounted to the moving member and the second set of AF terminal pads of the auto focus assembly are electrically connected to the first set of AF terminal pads of the moving member.

2. The camera lens assembly of claim 1, wherein the first set of AF terminal pads of the moving member and auto focus assembly are configured for a bottom-side access connection method.

3. The camera lens assembly of any of claim 1 wherein:
   the moving member includes:
   a spring metal plate having an open region;
   an insulating layer of material extending over at least portions of the open region; and
   at least one of the first set of AF terminal pads extending from the insulating layer and over the open region, wherein the at least one of the first set of AF terminal pads has a portion that extends beyond the insulating layer;
   a trace extending from the at least one of the first set of AF terminal pad; and
   the auto focus assembly includes at least one of the second set of AF terminal pads located adjacent to at least one of the first set of the AF terminal pads of the moving member.

4. The camera lens assembly of claim 3 and further including a base, and wherein an edge of the base is located outwardly from the open region of the spring metal plate to provide bottom-side access to the first set of AF terminal pads.

5. The camera lens assembly of any of claim 3 wherein an edge of the support member is located outwardly from the open region of the spring metal plate to provide bottom-side access to the first set of AF terminal pads.

6. The camera lens assembly of claim 3 wherein the open region of the spring metal plate is a region surrounded by the spring metal.

7. The camera lens assembly of claim 6 wherein the support member includes an open region providing bottom side access to the open region of the moving member spring metal plate and the first set of AF terminal pads.

8. The camera lens assembly of claim 7 and further including a base mounted to the support member, wherein the base has an opening providing bottom side access to the open region of the moving member spring metal plate and the first set of AF terminal pads.

9. The camera lens assembly of claim 1 wherein:
   the moving member includes:
   a spring metal plate;
   an insulating layer on the spring metal plate;
   at least one of the first set of AF terminal pads on the insulating layer; and
   a trace extending from the at least one first set of AF terminal pads; and
   the auto focus assembly includes at least one terminal pad of the second set of AF terminal pads located adjacent to the at least one of the first set of AF terminal pads on the moving member.

10. The camera lens assembly of claim 9 and further including an opening in the support member to provide bottom side access to a portion of the moving member spring metal plate adjacent to the moving member AF terminal.

11. The camera lens assembly of claim 10 wherein the portion of the moving member spring metal plate is an island.

12. The camera lens assembly of claim 1, wherein the AF terminal pads of the moving member are located on an inner diameter of the moving member.

13. The camera lens assembly of claim 10, wherein the island is configured to be electrically connected to the AF terminal pads of the auto focus assembly.

* * * * *